(12) United States Patent
Muukki et al.

(10) Patent No.: US 9,197,813 B2
(45) Date of Patent: Nov. 24, 2015

(54) METHOD AND APPARATUS FOR OBTAINING A DIGITAL IMAGE

(71) Applicant: Nokia Technologies Oy, Espoo (FI)

(72) Inventors: Mikko Muukki, Tampere (FI); Tomi Sokeila, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/894,837

(22) Filed: May 15, 2013

(65) Prior Publication Data

US 2014/0340538 A1    Nov. 20, 2014

(51) Int. Cl.
*H04N 5/232* (2006.01)
*H04N 5/225* (2006.01)
*G06K 9/32* (2006.01)
*H04N 1/21* (2006.01)

(52) U.S. Cl.
CPC ......... *H04N 5/23235* (2013.01); *H04N 1/2112* (2013.01)

(58) Field of Classification Search
CPC ............................................. H04N 2201/0414
USPC ............ 348/218.1, 333.01; 396/287; 715/769
See application file for complete search history.

(56) References Cited

U.S. PATENT DOCUMENTS

| | | | |
|---|---|---|---|
| 5,465,163 A * | 11/1995 | Yoshihara et al. | 358/444 |
| 6,516,154 B1 * | 2/2003 | Parulski et al. | 396/287 |
| 2006/0072820 A1 * | 4/2006 | Porjo et al. | 382/173 |
| 2007/0098297 A1 | 5/2007 | Fushiki et al. | |
| 2008/0013864 A1 | 1/2008 | Oh | |
| 2011/0285866 A1 | 11/2011 | Bhrugumalla et al. | |

FOREIGN PATENT DOCUMENTS

JP    2009134457 A    6/2009

* cited by examiner

*Primary Examiner* — Joel Fosselman
(74) *Attorney, Agent, or Firm* — Harrington & Smith (57) ABSTRACT

A method, apparatus and computer program are disclosed for: receiving from an image sensor image data; obtaining from the image data a source image and a user image so that the user image corresponds to a user set portion of the source image; wherein the source image and the user image are obtained on receiving the image data from the image sensor.

19 Claims, 5 Drawing Sheets

METHOD AND APPARATUS FOR OBTAINING A DIGITAL IMAGE

TECHNICAL FIELD

The present application generally relates to digital image capture.

BACKGROUND

Digital cameras capture images with image sensors. The digital images can then be digitally processed in camera or by using an external computer and suitable image editing software.

Already some film cameras enabled user to select a form factor such as portrait or panorama. Optical zooming has also been possible for a long time. On the other hand, there are some digital effects that can be produced already on taking the image, such as digital zooming, cropping and digital image stabilization. Digital cameras also enable storing a compressed jpeg image and a so-called raw image that is not compressed but instead comprises all the image information of an image frame that is produced by the image sensor. This setting is useful for both producing ubiquitously usable jpeg images that are ready to share while also storing raw images that are best suited for post-processing by a computer and image processing software. For instance, higher bit-depth typically helps to improve dark parts of images as different shades of colors can be discernible.

Modern digital cameras and especially modern camera-equipped mobile telephones are also increasingly often provided with in-camera image processing software with which the user can change tone, cropping, add blur or even produce advanced effects such as cinemagraph effects. When an image is edited, a new image is saved in place of the original or in addition to the original, as a separate image file.

It is an object of the invention to enhance user experience in digital image capture and/or to provide a new technical alternative.

SUMMARY

Various aspects of examples of the invention are set out in the claims.

According to a first example aspect of the present invention, there is provided a method comprising:

receiving from an image sensor image data;

obtaining from the image data a source image and a user image so that the user image corresponds to a user set portion of the source image; wherein the source image and the user image are obtained on receiving the image data from the image sensor.

The method may further comprise maintaining the source image. The source image may be maintained by storing the source image in a source image file.

The method may further comprise maintaining the user image. The maintaining of the user image may comprise storing the user image. The user image may be stored in a user image file. Alternatively, the maintaining of the user image may comprise or consist of storing derivation information that indicates how the user image can be obtained from the source image. The derivation information may be stored in a derivation information file. Alternatively, the derivation information may be stored in a derivation information database. The derivation information may comprise alignment information indicating the user set portion. The derivation information may comprise scaling information indicating how pixels in the user image are formed from potentially greater number of pixels in the source image. The derivation information may comprise processing information indicating how the source image is processed. The processing information may indicate whether and optionally also how much one or more of the following have been made: adding brightness; reducing brightness; adding contrast; reducing contrast; adding blur; reducing blur; performing selective blurring in background region; adjusting white balance; applying image compression; changing tones; changing geometry e.g. for mimicking tilt and/shift of lens; and any combination thereof.

The storing of the source image may be performed on receiving the image data from the image sensor.

The maintaining of the user image may be performed on receiving the image data from the image sensor.

The receiving of the image data from the image sensor and the obtaining of the source image and of the user image may be performed automatically on taking an image with the image sensor. The storing of the source image may be performed automatically on taking an image with the image sensor. The maintaining of the user image may be performed automatically on taking an image with the image sensor.

The method may further comprise storing a link between the source image and the user image. The storing of the link may associate together the source image and the user image. The link may be stored in any of: a source image file containing the source image; a user image file containing the user image; a link database; and any combination thereof.

The method may further comprise adding to an image gallery the user image, but not the source image. The method may comprise making the source image visible to the user on accessing the user image.

The image data may consist of the source image. Alternatively, the source image may be a multi-frame image obtained from image data that defines plural image frames.

The source image may be a full-size image. The source image may be a full resolution image.

The user image may be downscaled.

The image data may be received directly from the image sensor. Alternatively, the image data may be received via one or more intervening elements; data buses and/or circuitries.

The source image may represent one exposure period. Alternatively, the source image may be obtained by combining two or more images of respective different exposure periods e.g. for high dynamic range imaging, for multi-frame noise filtering and/or combining images with and without use of a flash. The different exposure periods may have different exposure time. In yet another alternative, the source image may represent one frame of a multi-frame image. In this case, the exposure time may be a fraction of normal in the prevailing light and with the used aperture and sensitivity (e.g. ISO value). The method may comprise forming one or more further images from the source image or from the image data so that the further images comprise or correspond to different user set portions of the source image. The user image as well as the further images may correspond to different user set portions of the source image but with a different resolution (e.g. following downscaling). The further images may be formed responsive to one or more user commands received from the user after the receiving of the image data from the image sensor.

The method may further comprise maintaining the further image. The maintaining of the further image may comprise storing the further image. The further image may be stored in a further image file. Alternatively, the maintaining of the further image may comprise or consist of storing derivation information that indicates how the further image can be obtained from the source image.

The method may comprise replacing the user image by a further image.

The forming of the user image may be based on user control. The user control may comprise any of: pre-setting image aspect ratio; pre-setting a crop region prior to the receiving of the image data; pre-setting digital zoom prior to the receiving of the image data; pre-setting down-sampling by combining pixels defined prior to the receiving of the image data; and any combination thereof.

The method may further comprise deleting the source image when all user images associated with the source image have been deleted.

The method may further comprise deleting the source image when a given number of source images have been stored or when a given amount of data has been occupied by stored source images.

The source image may be stored preserving image information. Alternatively, the source image may be stored using lossy compression. The user image may be formed from the source image before compression of the source image.

The method may further comprise receiving the image data from a camera unit. The image data may be received from the camera unit through a camera interface. The camera interface may comprise a digital bus configured to transfer image information in digital form.

The method may further comprise showing to a user a source image frame that illustrates the source image and any region thereof from which user image or user images have been formed.

The images may form frames for video sequences.

According to a second example aspect of the present invention, there is provided an apparatus comprising:

an input configured to receive from an image sensor image data; and a processor configured to cause:

obtaining from the image data a source image and a user image so that the user image corresponds to a user set portion of the source image; wherein the source image and the user image are obtained on receiving the image data from the image sensor.

The processor may be further configured to cause maintaining the source image. The processor may be further configured to cause maintaining the source image by storing the source image in a source image file.

The processor may be further configured to cause maintaining the user image. The processor may be further configured to cause maintaining the user image by storing the user image in a user image file.

The processor may be further configured to cause storing a link between the source image and the user image.

The processor may be further configured to cause adding to an image gallery the user image, but not the source image.

The processor may be further configured to cause making the source image visible to the user on accessing the user image.

The image data may consist of the source image. Alternatively, the source image may be a multi-frame image obtained from image data that defines plural image frames.

The source image may be a full-size image. The source image may be a full resolution image.

The user image may be downscaled.

The source image may represent one exposure period. Alternatively, the source image may be formed by combining two or more images of respective different exposure periods e.g. for high dynamic range imaging.

The processor may be further configured to cause obtaining one or more further images from the image data or from the source image so that the further images correspond to different user set portions of the source image. The processor may be further configured to cause the obtaining of the further images responsive to a user command received from the user after the receiving of the image data from the image sensor.

The processor may be further configured to cause maintaining the further image. The processor may be further configured to cause performing maintaining of the further image by storing the further image. The further image may be stored in a further image file. Alternatively, The processor may be further configured to cause performing the maintaining of the further image by storing derivation information that indicates how the further image can be obtained from the source image.

The processor may be further configured to form at least one of the user image and the one or more further images by using portions of different source images that represent different frames in multi-frame imaging.

The processor may be further configured to cause replacing the user image by a further image.

The obtaining of the user image may be based on user control. The user control may comprise any of: pre-setting image aspect ratio; pre-setting a crop region prior to the receiving of the image data; pre-setting digital zoom prior to the receiving of the image data; pre-setting down-sampling by combining pixels defined prior to the receiving of the image data; and any combination thereof.

The processor may be further configured to cause deleting the source image when all user images associated with the source image have been deleted.

The processor may be further configured to cause deleting the source image when a given number of source images have been stored or when a given amount of data has been occupied by stored source images.

The processor may be further configured to cause the storing of the source image preserving all image information. Alternatively, the processor may be further configured to cause the storing of the source image using lossy compression. The processor may be further configured to cause obtaining of the user image from the image data before compression of the source image.

The processor may be further configured to cause receiving the image data from a camera unit. The processor may be further configured to cause receiving the image data from the camera unit through a camera interface. The camera interface may comprise a digital bus configured to transfer image information in digital form.

The processor may be further configured to cause showing to a user a source image frame that illustrates the source image and any region thereof which the user image or user images correspond to.

According to a third example aspect of the present invention, there is provided a computer program product comprising a computer-readable medium bearing computer program code embodied therein for use with a computer, the computer program code comprising:

code for receiving from an image sensor image data; and code for obtaining from the image data a source image and a user image so that the user image corresponds to a user set portion of the source image; wherein source image and the user image are obtained on receiving the image data from the image sensor.

The computer program product may further comprise code for storing the source image.

The computer program product may further comprise code for storing the user image.

According to a fourth example aspect of the present invention, there is provided a computer-readable non-transitory medium encoded with instructions that, when executed by a computer, perform:

receiving from an image sensor image data; and obtaining from the image data a source image and a user image so that the user image corresponds to a user set portion of the source image; wherein the source image and the user image are obtained on receiving the image data from the image sensor.

The computer-readable non-transitory medium may be further encoded with instructions that, when executed by a computer, perform storing the source image.

The computer-readable non-transitory medium may be further encoded with instructions that, when executed by a computer, perform storing the user image.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 8 of the drawings.

Various examples will next be described to illustrate different example embodiments of the invention. The structures of these embodiments may be varied in many ways. It is intended to make reference to a schematic system presented in FIG. 1 in order to present a basic system in which example embodiments are described, and to then discuss various operations according to different example embodiments. This detailed description merely presents some example embodiments of the invention.

Figure 1:
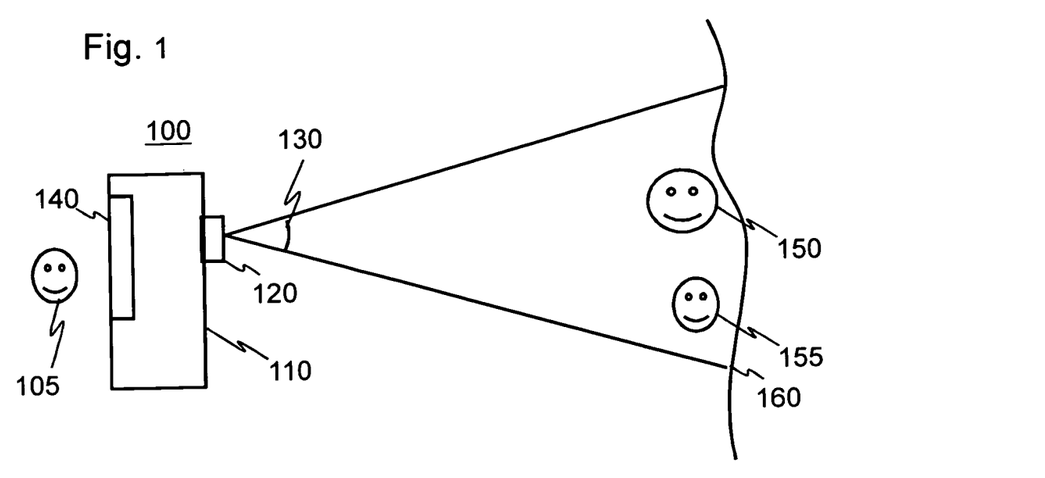
FIG. 1 shows a schematic system for use as a reference with which some example embodiments of the invention can be explained.

FIG. 1 shows a schematic system 100 for use as a reference with which some example embodiments of the invention can be explained. The system 100 comprises a device 110 such as a camera phone, gaming device, security camera device, personal digital assistant, tablet computer or a digital camera having a camera unit 120 with a field of view 130. The device 110 further comprises a display 140. FIG. 1 also shows a user 105 and an image object 150 that is being imaged by the camera unit 120 and a background 160 such as a curtain behind the image object.

In FIG. 1, the image object 150 is relatively small in comparison to the field of view at the image object 150. Next to the image object 150, there is a continuous background 160 and a secondary object 155. While this setting is not by any means necessary, it serves to simplify FIG. 1 and description of some example embodiments of the invention.

Figure 2:
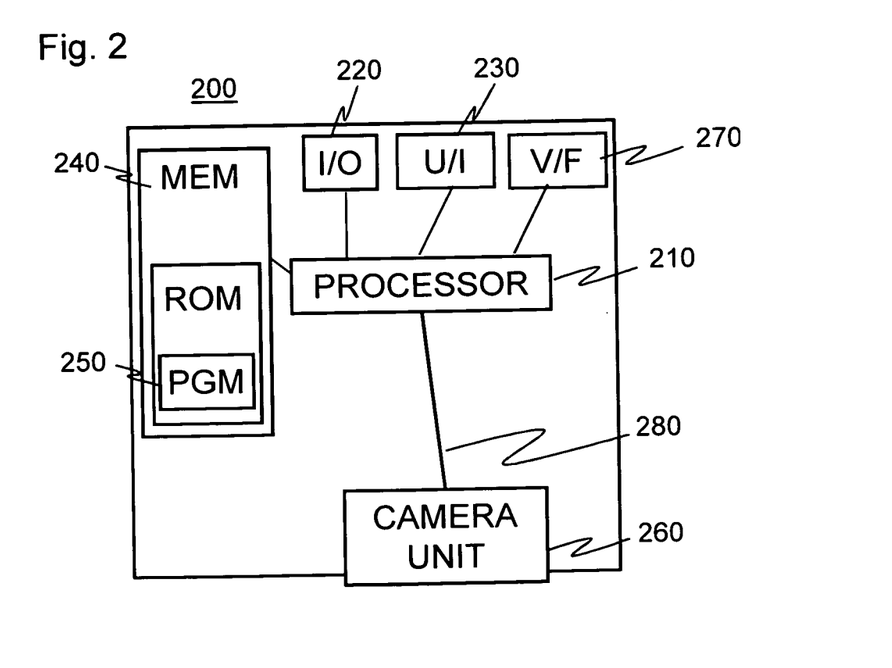
FIG. 2 shows a block diagram of an apparatus of an example embodiment of the invention.

FIG. 2 shows a block diagram of an apparatus 200 of an example embodiment of the invention. The apparatus 200 is suited for operating as the device 110. The apparatus 200 comprises a communication interface 220, a host processor 210 coupled to the communication interface module 220, and a memory 240 coupled to the host processor 210.

The memory 240 comprises a work memory and a non-volatile memory such as a read-only memory, flash memory, optical or magnetic memory. In the memory 240, typically at least initially in the non-volatile memory, there is stored software 250 operable to be loaded into and executed by the host processor 210. The software 250 may comprise one or more software modules and can be in the form of a computer program product that is software stored in a memory medium. The apparatus 200 further comprises a camera unit 260 and a viewfinder 270 each coupled to the host processor 210. The viewfinder 270 is implemented in an example embodiment by using a display configured to show a live camera view. The camera unit 260 and the processor 210 are connected via a camera interface 280.

Figure 3:
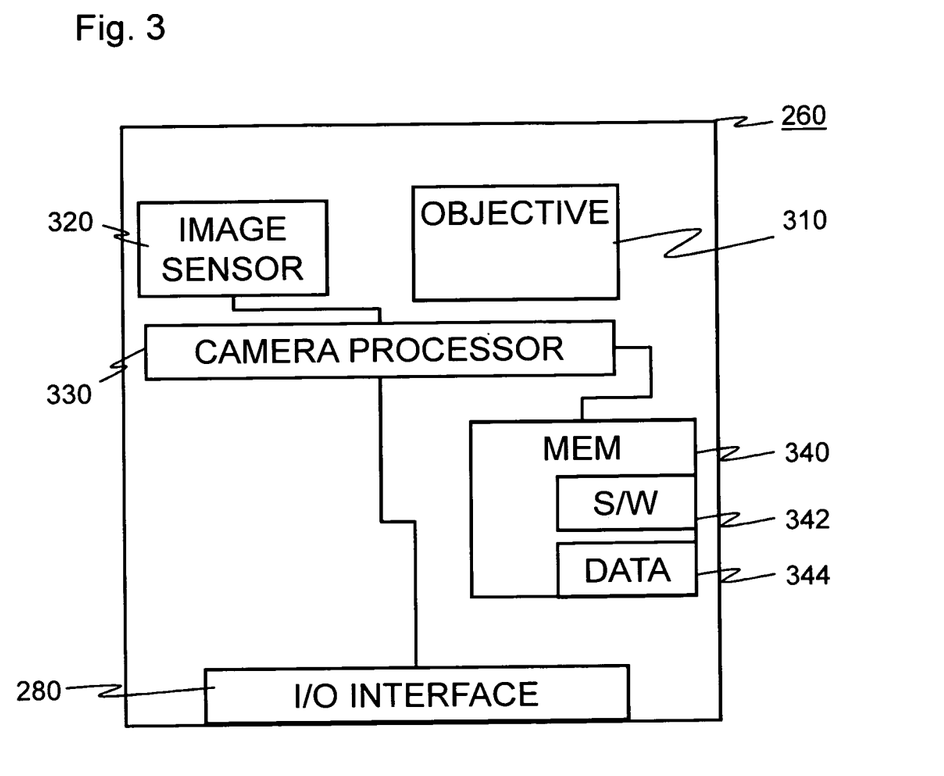
FIG. 3 shows a block diagram of a camera unit of an example embodiment of the invention.

Term host processor refers to a processor in the apparatus 200 in distinction of one or more processors in the camera unit 260, referred to as camera processor(s) 330 in FIG. 3. Depending on implementation, different example embodiments of the invention share processing of image information and control of the camera unit 260 differently between the camera unit and one or more processors outside the camera unit. Also, the processing is performed on the fly in one example embodiment and with off-line processing in another example embodiment. It is also possible that a given amount of images or image information can be processed on the fly and after that off-line operation mode is used as in one example embodiment. The on the fly operation refers e.g. to such real-time or near real-time operation that occurs in pace with taking images and that typically also is completed before next image can be taken.

It shall be understood that any coupling in this document refers to functional or operational coupling; there may be intervening components or circuitries in between coupled elements.

The communication interface module 220 is configured to provide local communications over one or more local links.

The links may be wired and/or wireless links. The communication interface 220 may further or alternatively implement telecommunication links suited for establishing links with other users or for data transfer (e.g. using the Internet). Such telecommunication links may be links using any of: wireless local area network links, Bluetooth, ultra-wideband, cellular or satellite communication links. The communication interface 220 may be integrated into the apparatus 200 or into an adapter, card or the like that may be inserted into a suitable slot or port of the apparatus 200. While FIG. 2 shows one communication interface 220, the apparatus may comprise a plurality of communication interfaces 220.

The host processor 210 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one host processor 210, but the apparatus 200 may comprise a plurality of host processors.

As mentioned in the foregoing, the memory 240 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. In some example embodiments, only volatile or non-volatile memory is present in the apparatus 200. Moreover, in some example embodiments, the apparatus comprises a plurality of memories. In some example embodiments, various elements are integrated. For instance, the memory 240 can be constructed as a part of the apparatus 200 or inserted into a slot, port, or the like. Further still, the memory 240 may serve the sole purpose of storing data, or it may be constructed as a part of an apparatus serving other purposes, such as processing data. Similar options are thinkable also for various other elements.

A skilled person appreciates that in addition to the elements shown in FIG. 2, the apparatus 200 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus when external power if external power supply is not available.

It is also useful to realize that the term apparatus is used in this document with varying scope. In some of the broader claims and examples, the apparatus may refer to only a subset of the features presented in FIG. 2 or even be implemented without any one of the features of FIG. 2. In one example embodiment term apparatus refers to the processor 210, an input of the processor 210 configured to receive information from the camera unit and an output of the processor 210 configured to provide information to the viewfinder. For instance, the image processor may comprise the processor 210 and the device in question may comprise the camera processor 330 and the camera interface 280 shown in FIG. 3.

FIG. 3 shows a block diagram of a camera unit 260 of an example embodiment of the invention. The camera unit 260 comprises an objective 310, an image sensor 320, a camera processor 330, a memory 340 comprising data 344 and software 342 with which the camera processor 330 can manage operations of the camera unit 260. The camera processor 330 operates as an image processing circuitry of an example embodiment. An input/output or camera interface 280 is also provided to enable exchange of information between the camera unit 260 and the host processor 210. The image sensor 320 is, for instance, a CCD or CMOS unit. In case of a CMOS unit, the image sensor 320 can also contain built-in analog-to-digital implemented on common silicon chip with the image sensor 320. In an alternative example embodiment, a separate A/D conversion is provided between the image sensor 320 and the camera processor 330.

The camera processor 330 takes care in particular example embodiments of one or more of the following functions:
- Pixel color interpolation;
- White balance correction;
- Edge enhancement;
- Aspect ratio control by selecting pixel detectors to be used in producing sub-images;
- Aspect ratio control by cropping or stretching taken sub-images;
- Anti-aliasing of images;
- Vignetting correction;
- Combining of subsequent images for high dynamic range imaging;
- Bayer reconstruction filtering;
- Chromatic aberration correction;
- Dust effect compensation; and
- Downscaling images.

In an example embodiment, the camera processor 330 performs little or no processing at all. The camera processor 330 is entirely omitted in an example embodiment in which the camera unit 260 merely forms a digitized image for subsequent processing e.g. by the host processor 210.

In an example embodiment, the information produced by the camera unit 260 is referred to as image data. In another example embodiment, the information produced by the image sensor 320 is referred to as image data. In yet another example embodiment, the camera unit performs no further processing beyond possible analog to digital conversion and the image data produced by the image sensor 320 is also image date of the camera unit 260.

The data 344 comprises, for example, cropping data that defines corners of each user image or further image that is desired to be captured. The cropping data is received, according to an example embodiment, through the interface 280 from the host processor 210. The cropping data also comprises, in an example embodiment, downscaling information indicating e.g. how much the resolution of the image in question has been scaled down in X and/or Y directions. The cropping data may be contained in correspondence data that is described subsequently in more detail. It is understood that there are various different implementations according to different example embodiments for the apparatus 200 as well as for the camera unit 260. For instance, the apparatus 200 can be provided with an image accelerator configured to process information received from the interface 280 that otherwise would be performed by the host processor 210 or by the camera processor 330. Moreover, either or both of the host processor 210 and of the camera processor 330 can be implemented using one or more processors. Further still, the data 344 described in the foregoing can be used in an example embodiment in which the camera unit 260 produces the source image and one or more sub-images (e.g. user image and optionally also further images). In another example embodiment, in which the camera unit only produces the source image or image information for subsequent producing of the source image (e.g. if digital image stabilization is performed downstream from the camera unit 260), the data 344 is not necessarily provided at all. In yet another example embodiment, the camera unit 260 stores in its memory 340 the source images and transfers sub-images over the interface 280 to the host device (e.g. to the host processor 210). In this example embodiment, the camera unit 260 may be further configured to issue further sub-images from earlier stored source images at a later time based on instructions received from the host device. By storing the source images in the camera unit's memory 340, the traffic over the interface 280 may be reduced. In some implementations, this may lead into higher serial photographing frame rate.

Figure 4:
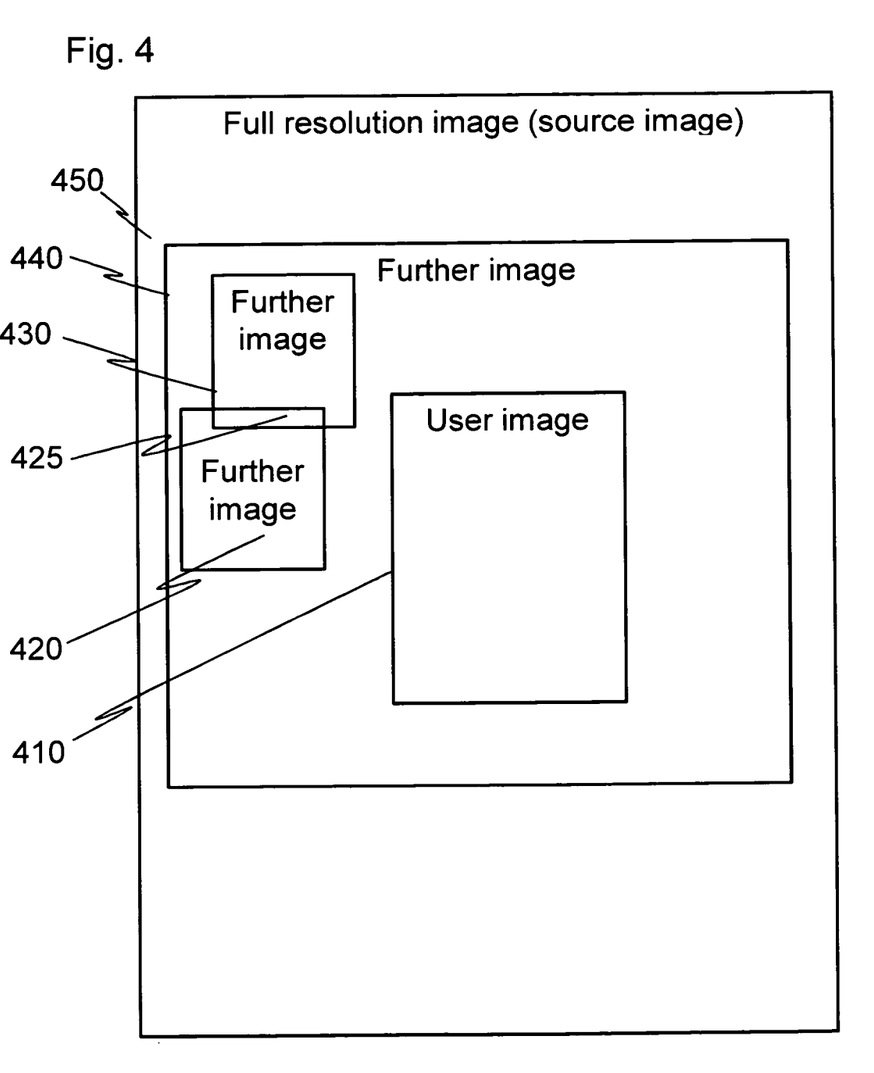
FIG. 4 shows an example of concurrent four imaging regions.

FIG. 4 shows an example of four different sub-images 410 to 440 and one full resolution image or source image 450, with respect to imaging area of the image sensor 320. In an example embodiment, the image data defines the source image 450. One of the sub-images is referred to as a user image 410. In an example embodiment, the user image 410 comprises a user set portion of the source image 450. The portion is in an example embodiment anything under 100% of the source image. In another example embodiment, the portion is up to 100% i.e. the sub-images may correspond to the entire image area of the source image 450 (although possibly with lower resolution and/or higher image compression). Two further images 420, 430 have an overlapping region 425. One further image 440 covers all of the other sub-images. In FIG. 4, the user image 410 is drawn in the center of the source image 450 and with the same aspect ratio as the source image 450, as an example of common use case in which a portion of the image is zoomed in. On displaying, the user image 410 can be scaled to fill the entire space that is assigned for showing the user image 410. However, if the user image 410 is formed e.g. to surround a given image object such as a person or group of persons, the user image 410 need not be co-centric with the source image 450. Moreover, digital image stabilization can also be employed in which case the user image 410 can also be off-set from the center of the source image 450. Notice that in an example embodiment, the source image represents one exposure period or the source image is obtained by combining two or more images of respective different exposure periods e.g. for high dynamic range imaging, for multi-frame noise filtering and/or combining images with and without use of a flash. Further, the different exposure periods can have different exposure time.

In an example embodiment, different sub-images differ such that some imaging regions are recorded by the apparatus 200 as still images while some other imaging regions are recorded as video images or still images of different spatial resolution. In an example embodiment, the spatial resolution is adjusted to produce video images or still images of desired size in terms of horizontal and vertical pixels.

The adjustment of the spatial resolution can be performed by the apparatus 200 by downscaling or upscaling imaging regions using any of the known techniques such as skipping pixels, averaging pixels, interpolating pixels, bilinear downscaling, bicubic downscaling, lanczos downscaling, replicating pixels and edge enhancing.

In an example embodiment, the image data for the full-resolution or source image 450 is obtained by the apparatus 200 from the image sensor 320 by transferring over the camera interface 280 for each subsequent image frame period, whereas the sub-images are formed by the host processor 210 or other equipment downstream from the camera interface 280. These subsequent image frame periods are in an example embodiment at least sometimes multi-frame imaging exposure periods so that one or more sub-images can be obtained by combining portions of given multi-frame constituent images. In an example embodiment, the source image 450 is readily formed from multiple frames and the sub-images are obtained from the source image. In another example embodiment, the source image 450 merely represents one multi-frame imaging exposure period such that the sub-image(s) is (are) obtained from two or more source images 450.

It is also possible to perform the maintaining or storing of the user image in different ways. In an example embodiment, the storing of the user image, or any sub-image, comprises or consists of storing derivation information that indicates how the user image can be obtained from the source image. The derivation information comprises in an example embodiment any of: alignment information indicating the user set portion; scaling information indicating how pixels in the user image are formed from potentially greater number of pixels in the source image; processing information indicating how the source image is processed; and any combination thereof. The processing information can indicate e.g. any of the type of processing and the amount of processing of given type or types is made, wherein the processing is e.g. one or more of the following have been made: adding brightness; reducing brightness; adding contrast; reducing contrast; adding blur; reducing blur; performing selective blurring in background region; adjusting white balance; applying image compression; changing tones; changing geometry e.g. for mimicking tilt and/shift of lens; and any combination thereof. By storing only the derivation information, storage space may be substantially saved and/or further modifications can may be performed without loss of information even if ultimately the sub-images were output as image files to an external device or shared in some Internet based service, for example.

The processing of the image data or of the source image 450 and of the sub-images 410 to 440 is next described in further detail with reference to FIGS. 5 to 8.

Figure 5:
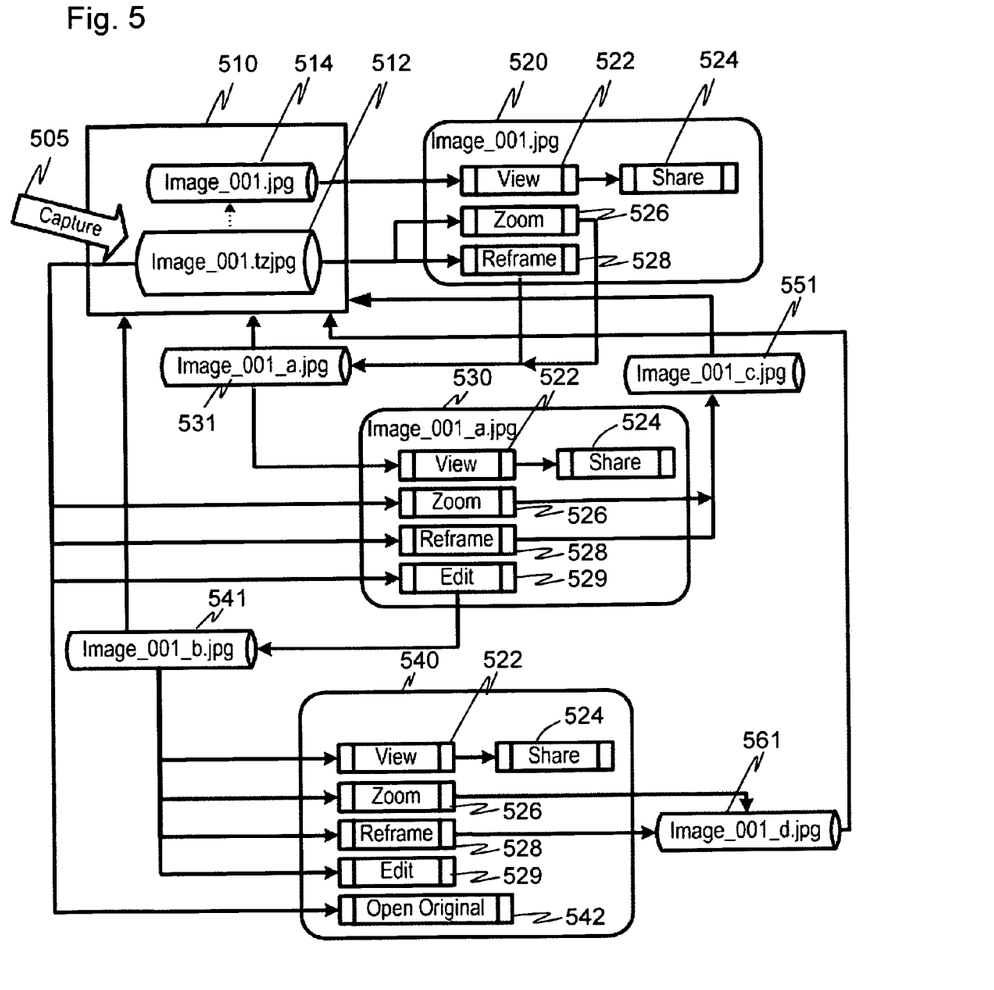
FIG. 5 shows a state chart illustrating transitions between various processing states according to an example embodiment.

FIG. 5 shows a state chart illustrating transitions between various processing states according to an example embodiment. First, the image data are received 505 and the source image 450 is stored based on the image data e.g. with a first file name 512 (e.g. image_001.tzjpg). The received image data are then deleted or let to be overwritten in an example embodiment.

The first file name has an in the example embodiment of FIG. 5 an extension not normally associated with image viewing programs. The user image 410 is stored with a second file name 514 e.g. with file name image_001.jpg.

In an example embodiment, the image data are received 505 from the image sensor (possibly through intervening equipment) and the user image 410 is obtained automatically in response to the taking of an image by the camera unit 260.

In an example embodiment, the source image 450 is a full size or full resolution image that has all the pixels produced by the camera unit 260. The user image 410, on the other hand, can be a down-scaled image e.g. such that each pixel of the user image 410 is formed from two or more pixels of the source image 450 (e.g. from 2, 4, 8 or 16 pixels of the source image 450). Notice that in sake of simplicity the user image 410 can be described as if formed from the source image although the user image 410 and the source image may both be obtained from the image data.

In FIG. 5, the second file name 514 that shares a common body with the first file name 512. This file naming stores a link between the source image and child images derived from common image data. Notice also that it is possible to use lossy compression or lossless compression in either or both of the source image and sub-images such as the user image 410. Moreover, lossy and lossless compression can be used alternately e.g. based on user choice. Examples of suitable lossy compression involve:

Reducing the color space to the most common colors in the image;

Chroma subsampling;
Transform coding such as the Discrete Cosine Transform (DCT); and
Fractal compression.
JPEG is an example of a lossy compression image format.
Examples of lossless compression methods involve:
Run-length encoding;
DPCM and Predictive Coding;
Entropy encoding;
Adaptive dictionary algorithms (e.g. LZW);
Deflation (e.g. PNG, MNG, and TIFF); and
Chain codes.
DNG is an example of a lossless image format.

The source image and user image are now stored e.g. in a memory of the apparatus 200. The second image 514 is then used 520 by the user 105. For instance, the user may access a thumbnail of the second image 514 through an image gallery or the apparatus simply shows the second image 514 automatically after the user 105 has taken an image, see state 520. For instance, the user may view 522 the second image and share 524 the second image. On the other hand, in an example embodiment, the user is provided with further options Zoom 526 and/or Reframe 528. With both the zooming and reframing, the first image 512 (source image) is used as a basis. This way, the zooming and reframing can employ parts of the original image that are outside the second image 514. The user can also be provided with a panning option (not shown for simplicity of drawing) in which the position of the second image can be changed within the first image. Also in the panning, the first image 512 is used as a basis.

In an example embodiment, any sub-images (e.g. the user image 410 or here the second image 514) are provided with correspondence data that comprises e.g. co-ordinates and an optional zoom factor for indicating the portion of the first image 512 to which the second image 514 corresponds. The correspondence data can be maintained during processing of the sub-images and adapted on zooming, reframing and panning. In an example embodiment, the correspondence data is maintained as a metadata entry of respective image files.

In an example embodiment, after zooming 526, the user 105 is allowed to store a zoomed image as a new sub-image or in place of the sub-image that the user 105 was zooming. Notice that the term sub-image was used as the subject of the zooming 526 as that is what appears to the user even if actually it were the corresponding portion of the first image 512 that is being zoomed rather than the second image 514.

In FIG. 5, a first new sub-image 531 is formed by the zooming 526 and reframing 528 and then stored and added in the image gallery.

Notice that in an example embodiment, the user 105 may pan and zoom the image displayed to her, but a new image is stored only after the user 105 instructs the apparatus 200 to store an edited image.

FIG. 5 also shows the case that the user chooses to use the first new image 531, see state 530. Here, the user may view 522, share 524, zoom 526, reframe 528 and/or pan just as in state 520 in which the second image was being used so that a new sub-image 551 is produced or the currently edited sub-image is replaced. Moreover, another option Edit 529 is shown. This option can also be provided in the state 520 in which the second image 514 is being handled, although not drawn in sake of simplicity of the drawing. The editing 529 is a function in which the user is allowed to perform any image editing, such as red eye removal, adjusting of brightness, contrast, saturation, gamma curves, softening, sharpening, tone adjustment, white balance adjustment, drawing and removing of image objects by extrapolating surroundings.

The image editing involves manual and/or automatic processing. After editing, the user can be allowed to replace the edited sub-image or to store the edited sub-image as a new sub-image 541. In an example embodiment, the association or link between the source image and the second image 514 or any further sub-image derived thereof is disconnected if the sub-image in question is edited such that the source image might no longer suit for expanding the sub-image using the source image. This disconnecting comprises in an example embodiment deleting the link between the source image and the user image or another child image or sub-image derived from common image data with the source image. In this connection, the source image may be deleted or still maintained as long as any child or sub-image thereof is maintained or until the source image is to be deleted in part of normal housekeeping.

On bottom of FIG. 5, there is drawn yet another option, Open original 542. With this option, the user 105 can open the first image 512 that is not shown in the image gallery according to an example embodiment. In an example embodiment, the user is allowed to edit the first image 512. In this case, the association of the first image 512 and sub-images (e.g. second image 514) may be disconnected, if the first image is so edited that it would not necessarily suit to modifying the sub-images. As mentioned in the foregoing, the disconnecting of the association can also occur if the sub-image in question is edited such that there is no benefit in maintaining the association.

The first image can also be effectively accessed through the reframing 528 by expanding framing of a sub-image to comprise the entire first image 512. On accessing the first image 512, the user 105 can also be let to delete the first image 512 e.g. for saving memory, although in an example embodiment, the first image 512 is concealed from appearing in the image gallery and automatically deleted e.g. on any one or more of the following conditions: after given time or when the free memory shrinks below given threshold or when the used memory exceeds a given threshold.

In an example embodiment, a shortcut file is generated instead of a new copy of the first image 512 if the user reframes a sub-image to cover the entire first image 512 with its full resolution. In this case, the apparatus can be configured to access the first image instead of the shortcut file when images are shown in the image gallery or transferred to an external device such as memory card or personal computer. Otherwise, the first image file is not transferred to the external device but only sub-images are transferred on copying or moving images to the external device, according to an example embodiment.

The first image 512 is deleted in an example embodiment when last sub-image associated with the first image 512 is deleted.

Speaking of the image gallery, there are various example embodiments for enhancing user experience. In an example embodiment, even if there are two or more sub-images formed corresponding to one first image 512, only one of the sub-images is (initially) shown in the image gallery. Presence of further sub-images can be indicated e.g. with a suitable sign such as a plus sign or corners of other images appearing next to the shown sub-image or its thumbnail image. Then, the other sub-images or their thumbnails can be shown one or more at the time e.g. in response to the user tapping on or swiping a touch screen at shown sub-image or its thumbnail.

In the reframing 528, the first image 512 or a coarse version of the first image 512 can be shown to the user with markers of existing sub-image(s) to indicate parts of the first image that appear in the sub-image(s). The markers can be e.g.

implemented as boxes such as those in FIG. 4. Alternatively or additionally, the markers can be formed by making the first image 512 appear dimmer or brighter outside portions occupied by sub-images. In an example embodiment, sub-image names (e.g. image file names or numbers) are shown in connection with each sub-image area on the first image 512.

In an example embodiment in which lossless compression is used in the first and second images, the zooming, reframing and panning can be also arranged such that needed additional parts are added to the second image 514 from the first image 512 while maintaining those parts of the second image that do not change. In this embodiment, downscaling can be performed before the additional parts are added to the second image 514.

Various processing options of different example embodiments are next described with reference to FIGS. 6 to 8.

Figure 6:
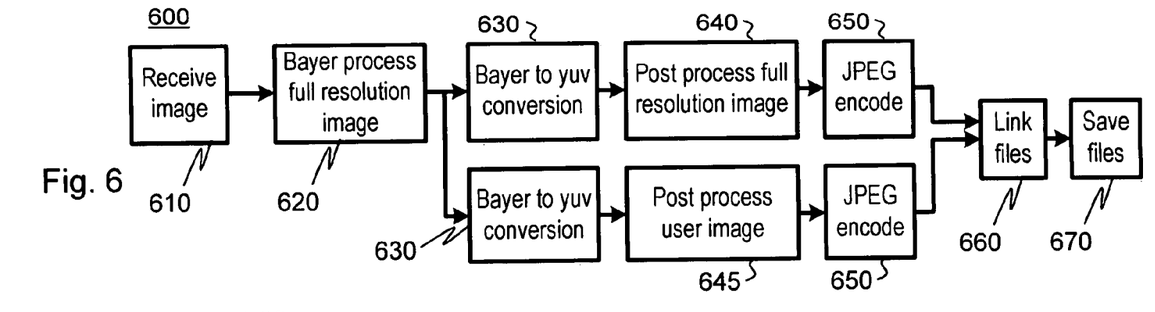
FIG. 6 shows a first image capture process according to an example embodiment.

FIG. 6 shows a first image capture process 600 according to an example embodiment of the invention. The first image capture process 600 comprises receiving 610 an image (from the camera unit 260); performing Bayer processing 620 for the entire image or first image 512; and performing Bayer to YUV conversion 630 in a first branch for the first image in parallel with performing Bayer to YUV conversion 630 in a second branch for the user image (second image 514). The processing in the first branch continues by post processing 640 and image encoding 645 such as jpeg encoding. FIG. 6 shows that the processing in the second branch continues in parallel with the processing of the first branch by post processing 645 and image encoding 645 such as jpeg encoding.

Notice that in an example embodiment, the parallel branches are processed in parallel i.e. at least partly simultaneously whereas in another example embodiment, the branches are processed one after another.

The first branch and the second branches produced image encoded files are then linked 660 and saved 670. In an example embodiment, the linking 660 of the files comprises associating the files with each other by storing suitable records in an association database. In an example embodiment, the linking 660 of the files comprises associating the files with each other by using suitable file names that indicate the association as explained in the foregoing.

Figure 7:
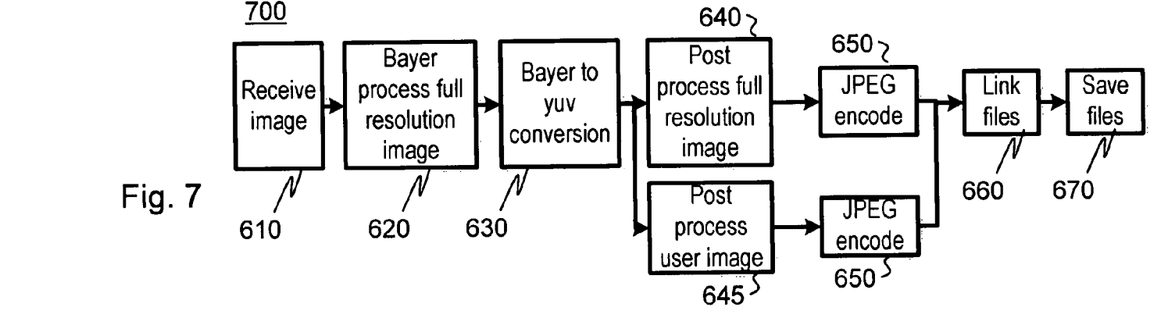
FIG. 7 shows a second image capture process according to an example embodiment of the invention.

FIG. 7 shows a second image capture process 700 according to an example embodiment of the invention. The second image capture process 700 comprises same steps as the first image capture process except that here the Bayer to YUV conversion is common for the first and second branches.

Figure 8:
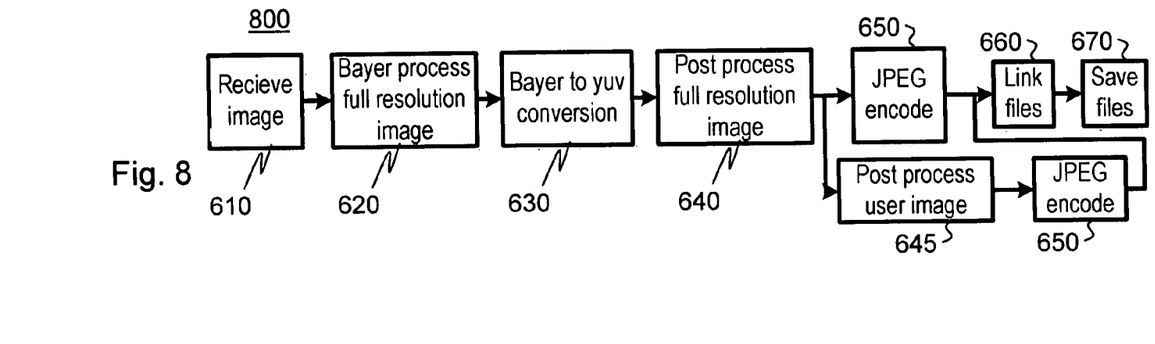
FIG. 8 shows a third image capture process according to an example embodiment of the invention.

FIG. 8 shows a third image capture process 800 according to an example embodiment of the invention that otherwise corresponds to the second image capture process except that the post processing 645 of the second branch is performed based on post processing 640 of the first image.

In the foregoing, it has been generally assumed that an image is captured on initiative of the user e.g. when the user 105 presses a trigger button. Alternatively or additionally, the image capture can be triggered by analyzer software. For instance, a face tracker and/or object tracker can be configured to decide to capture an image when given object or objects appear to the image sensor. In an example embodiment, the user 105 is at least occasionally an automated entity such as a programmed controller or processor of the apparatus 200 or even an external device that uses the apparatus 200 for taking images e.g. for image and/or video surveillance purpose.

In an example embodiment, when the user 105 initiates taking of an image, a full resolution image is generated and multiple of sub-images are generated. For instance, the full resolution image or first image may have a resolution of 40 M pixels and the sub-images may have e.g. 2, 5, 8 or 12 M pixels. The sub-images can be differently cropped, zoomed and/or downscaled. Some of the sub-images can also be overlapping with one or more other sub-images.

In this document, term pixel generally refers to a picture element that represents color of an image at that picture element with given bit depth either in monochrome or two or more colors. Each pixel may be divisible into two or more sub-pixels especially in case of color images.

The full resolution image may refer to an image that contains all the pixels produced by the camera unit in an image frame. The image sensor may be capable of producing some further pixels at one or more edges thereof e.g. if digital image stabilization is used so that varying portion of the image sensor's image is used to accrue an image of a given field of view while some handshake is present. Also some pixel detection elements may be assigned for other purposes such as white balance measurement, focus measurement and/or simply left unused as the same image sensor is manufactured also for higher resolution camera units.

Without in any way limiting the scope, interpretation, or application of the claims appearing below, a technical effect of one or more of the example embodiments disclosed herein is that a full-resolution image can be kept available and automatically used for reframing and changing zooming (e.g. zooming out) of user images that represent only portion of the entire imaging area. Another technical effect of one or more of the example embodiments disclosed herein is that making use of the first image on repeated modifications of user images may reduce quality degradation that could otherwise be caused by repeated lossy encoding operations. Another technical effect of one or more of the example embodiments disclosed herein is that sub-images can be linked with the first image such that different images based on a common exposure time or moment of time can be logically associated and subsequently identified to the user. Yet another technical effect of one or more of the example embodiments disclosed herein is that digital images can be taken with tight framing or with digital zooming while the entire first image is maintained for enabling subsequent modifications with little or no quality degradation. Yet another technical effect of one or more of the example embodiments disclosed herein is that digital images can be formed using multi-frame techniques such that either or both the framing and multi-frame combination can be changed afterwards by the user.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. A method comprising:
    receiving, image data directly from an image sensor upon taking an image;
    obtaining, at substantially a same time from the taking of the image and receiving the image data, a source image and a separate user image so that the user image corresponds to a portion of the source image, where the portion forming the user image is set before the taking of the image; wherein the source image and the user image are automatically obtained based upon the taking of the image and receiving the image data directly from the image sensor and subsequently maintaining both the source image and the user image upon the taking of the image by the image sensor.

2. The method of claim 1, further comprising adding to an image gallery the user image, but not the source image.

3. The method of claim 1, further comprising obtaining one or more further images from the source image so that the further images correspond to different portions of the source image.

4. The method of claim 1, wherein further comprising storing a link between the source image and the user image.

5. The method of claim 1, further comprising deleting the source image when all user images derived from the source image have been deleted or when a given number of source images have been stored or when a given amount of data has been occupied by stored source images.

6. The method of claim 1, further comprising receiving the source image from a camera unit.

7. The method of claim 1, further comprising making the source image visible to a user on accessing the user image.

8. The method of claim 1, where the user image corresponds to a portion of the source image and the portion is a user set portion set before the image is taken by the image sensor.

9. An apparatus comprising:
    an input configured to directly receive image data upon taking an image by an image sensor; and
    a processor configured to cause:
    obtaining, at substantially a same time from the taking of the image and receiving the image data, a source image and a separate user image so that the user image corresponds to a portion of the source image, where the portion forming the user image is set before the taking of the image; wherein the source image and the user image are automatically obtained based upon the taking of the image and receiving the image data directly from the image sensor and subsequently maintaining both the source image and the user image upon the taking of the image by the image sensor.

10. The apparatus of claim 9, wherein the processor is further configured to cause adding to an image gallery the user image, but not the source image.

11. The apparatus of claim 9, wherein the source image represents one exposure period or the source image is obtained by combining two or more images of respective different exposure periods.

12. The apparatus of claim 9, wherein the processor is further configured to cause obtaining one or more further images from the source image so that the further images correspond to different portions of the source image.

13. The apparatus of claim 12, wherein the processor is further configured to cause the obtaining of the further images responsive to a user command received from the user after the receiving of the source image from the image sensor.

14. The apparatus of claim 9, wherein the processor is further configured to cause storing a link between the source image and the user image.

15. The apparatus of claim 9, wherein the processor is further configured to cause making the source image visible to a user on accessing the user image.

16. The apparatus of claim 9, wherein the processor is further configured to cause receiving the source image from a camera unit.

17. The apparatus of claim 9, wherein the processor is further configured to cause showing to a user a source image frame that illustrates the source image and any region thereof from which user image or user images have been obtained.

18. A computer program product comprising a computer-readable non-transitory medium bearing computer program code embodied therein for use with a computer, the computer program code comprising:
    code for receiving, image data directly from an image sensor upon taking an image; and
    code for obtaining, at substantially a same time from the taking of the image and receiving the image data, a source image and a separate user image so that the user image corresponds to a portion of the source image, where the portion forming the user image is set before the taking of the image; wherein the source image and the user image are automatically obtained based upon the taking of the image and receiving the image data directly from the image sensor and subsequently maintaining both the source image and the user image upon receiving the image data upon the taking of the image.

19. A computer-readable non-transitory medium encoded with instructions that, when executed by a computer, perform:
    receiving, image data directly from an image sensor upon taking an image; and
    obtaining, at substantially a same time from the taking of the image and receiving the image data, a source image and a separate user image so that the user image corresponds to a portion of the source image, where the portion forming the user image is set before the taking of the image; wherein the source image and the user image are automatically obtained based upon the taking of the image and receiving the image data directly from the image sensor and subsequently maintaining both the source image and the user image upon receiving the image data upon the taking of the image.

* * * * *